United States Patent
Benisty et al.

(10) Patent No.: US 10,114,586 B1
(45) Date of Patent: Oct. 30, 2018

(54) SYSTEM AND METHOD FOR USING HOST COMMAND DATA BUFFERS AS EXTENDED MEMORY DEVICE VOLATILE MEMORY

(71) Applicant: Western Digital Technologies, Inc., San Jose, CA (US)

(72) Inventors: Shay Benisty, Be'er Sheva (IL); Yoav Weinberg, Thornhill (CA)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 15/630,438

(22) Filed: Jun. 22, 2017

(51) Int. Cl.
*G06F 3/06* (2006.01)
*G06F 13/16* (2006.01)

(52) U.S. Cl.
CPC ............ *G06F 3/0656* (2013.01); *G06F 3/061* (2013.01); *G06F 13/1673* (2013.01)

(58) Field of Classification Search
CPC ..... G06F 3/061; G06F 3/0656; G06F 13/1673
See application file for complete search history.

(56) References Cited

U.S. PATENT DOCUMENTS

| 6,526,477 | B1* | 2/2003 | Yuan | ............... G06F 3/061 |
| | | | | 710/52 |
| 2006/0112252 | A1* | 5/2006 | Dixon | ............... G06F 12/0866 |
| | | | | 711/170 |
| 2006/0161733 | A1 | 7/2006 | Beckett et al. | |
| 2012/0151472 | A1 | 6/2012 | Koch et al. | |
| 2014/0281040 | A1 | 9/2014 | Liu | |
| 2015/0127882 | A1 | 5/2015 | Carlson et al. | |
| 2015/0199149 | A1* | 7/2015 | Sankaranarayanan | ............... G06F 3/0653 |
| | | | | 711/102 |
| 2015/0254088 | A1 | 9/2015 | Chou et al. | |
| 2016/0004438 | A1 | 1/2016 | Moon et al. | |

(Continued)

OTHER PUBLICATIONS

Janene Ellefson, SSD Product Market Manager—PCIe, Micron Technology, "NVM Express: Unlock Your Solid State Drives Potential", Flash Memory Summit 2013, Santa Clara, CA, 114 pages.

(Continued)

*Primary Examiner* — Nimesh G Patel
(74) *Attorney, Agent, or Firm* — Morgan, Lewis & Bockius LLP

(57) ABSTRACT

Systems and methods for using host command data buffers as extended memory device volatile memory are disclosed. NVM Express implements a paired submission queue and completion queue mechanism, with host software on the host device placing commands into the submission queue. Commands may include an indication of a host buffer, resident on the host device, in which to store data for access by the host device. The memory device may use the host buffer as extended memory during execution of the command. As one example, the memory device may process the command in stages, with each stage retrieving data from the host buffer, manipulating the data, and writing the processed data to the same host buffer. As another example, the host buffer can be used for memory device internal relocation and garbage collection operations. Thus, the area/cost of the memory device controller is reduced since less volatile memory is required.

20 Claims, 11 Drawing Sheets

(56) References Cited

U.S. PATENT DOCUMENTS

| | | |
|---|---|---|
| 2016/0026388 A1* | 1/2016 | Jeong .................. G06F 3/061 |
| | | 711/103 |
| 2016/0077740 A1 | 3/2016 | Hussain et al. |
| 2016/0085718 A1 | 3/2016 | Huang |
| 2016/0140041 A1 | 5/2016 | Niu et al. |
| 2016/0147442 A1 | 5/2016 | Baderdinni et al. |
| 2016/0188510 A1 | 6/2016 | Singh et al. |
| 2016/0267016 A1 | 9/2016 | Lee et al. |
| 2016/0292007 A1 | 10/2016 | Ding et al. |
| 2016/0306723 A1* | 10/2016 | Lu .................. G06F 11/2094 |
| 2016/0321012 A1 | 11/2016 | Clark et al. |
| 2017/0075629 A1 | 3/2017 | Manohar et al. |
| 2017/0075828 A1 | 3/2017 | Monji et al. |
| 2017/0123659 A1 | 5/2017 | Nam et al. |
| 2017/0123722 A1* | 5/2017 | Sela .................. G06F 3/0656 |
| 2017/0154685 A1* | 6/2017 | Kim .................. G11C 16/3431 |
| 2017/0177222 A1 | 6/2017 | Singh et al. |
| 2017/0371584 A1* | 12/2017 | Hsieh .................. G06F 3/0656 |

OTHER PUBLICATIONS

Kevin Marks, Dell, Inc., "An NVM Express Tutorial", Flash Memory Summit 2013, Santa Clara, CA, 92 pages.

Unpublished U.S. Appl. No. 15/148,409 entitled "Systems and Methods for Processing a Submission Queue" filed on May 6, 2016, pending, 66 pages.

Specification and Drawings of U.S. Appl. No. 15/457,676 entitled "Storage System and Method for Thermal Throttling via Command Arbitration" filed on Mar. 13, 2017; 32 pages.

* cited by examiner

SYSTEM AND METHOD FOR USING HOST COMMAND DATA BUFFERS AS EXTENDED MEMORY DEVICE VOLATILE MEMORY

BACKGROUND

Non-Volatile Memory Express (NVMe) is a standard for accessing non-volatile storage media attached via PCI Express (PCIe) bus. NVMe may be used with a variety of non-volatile storage media, such as solid state drives (SSDs). One focus of NVMe relates to I/O communication between a host device (which may access and/or write to the non-volatile storage media) and a memory device (which includes the non-volatile storage media). In that regard, NVMe implements a paired submission queue and completion queue mechanism, which may reside in the host device, with host software on the host device placing commands into the submission queue, and then notifying the memory device of the commands placed into the submission queue. Responsive to the notice, the memory device fetches the commands from the submission queue. One type of command is a read command, in which the host device may allocate a host command data buffer resident on the host device. In executing the command, the memory device causes the read data to be stored in the host command data buffer so that the host device may access the read data.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

DETAILED DESCRIPTION OF EMBODIMENTS

Overview

Figure 1A:
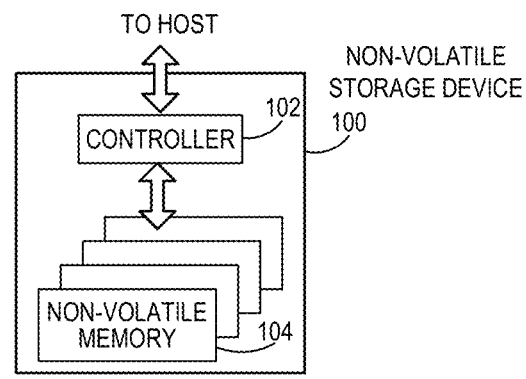
FIG. 1A is a block diagram of an exemplary non-volatile memory system.

As discussed in more detail below, the host device causes commands to be submitted to the submission queue (such as by direct submission for a submission queue resident on the host device). One example command is a read command, whereby the host device commands the memory device to read data from its non-volatile memory and to send the read data to the host device. Another example command is a write command, whereby the host device commands the memory device to read data from buffer (such as a buffer resident on the host device) and to write the read data to non-volatile memory in the memory device. Further, the host device may allocate a section of memory resident on the host device (e.g., host command data buffer) in order for the memory device to store the read data therein or in order for the memory device to read the data to write to non-volatile memory. Thereafter, the host device notifies the memory device of the commands on the submission queue. In response to being notified, the memory device fetches the commands from the submission queue and processes the commands. In this regard, the memory device performs operations responsive to receipt of the host command, with the operations ultimately resulting in host command data. After the memory device generates the host command data, the memory device causes the host command data to be stored in the host command data buffer. Thereafter, the memory device posts a completion message to the completion queue, and sends a notification to the host device of the completion message on the completion queue. Responsive to the notice, the host device reads the host command data from the host command buffer. Further, responsive to the notice, the host device may re-allocate the memory space associated with the host command data buffer for another purpose.

In the example of a read command, the memory device reads the data from non-volatile memory as commanded in the read command. The memory device may perform other operations, such as error correction or a cryptography operation (such as decryption), in order to generate the host command data. The memory device may cause the host command data (e.g., the error-corrected data read from the non-volatile memory of the memory device) to be stored in the host command data buffer. Responsive to notice of completion of the read command, the host device reads the error-corrected data stored in the host command data buffer.

In one implementation, the memory device may use the host command data buffer for purposes in addition to storing host command data. As discussed in more detail below, the memory device may use the host command data buffer as an extended memory (such as an extended volatile memory) for a certain period of time (such as until the memory device notifies the host device of the completion message on the completion queue). Further, the discussion below focuses on the host command data buffer that is used for a read command (whereby the data read from the memory device is stored in the host command data buffer). As discussed above, the host device may also use a host command data buffer with a write command, whereby the host device stored the data to be written to non-volatile memory in the host command data buffer. Responsive to receiving the write command, the memory device reads the data stored in the host command data buffer, and stores the read data into non-volatile memory in the memory device. The discussion below focuses on a host command data buffer in the context of a read command. Alternatively, the memory device may use the host command data buffer for purposes in addition to reading data from the host command data buffer. In instances where the host device does not expect the data in the host command data buffer to change (so that the data stored in the data buffer may be overwritten), after the memory device reads the data from the host command data buffer, the memory device may use the host command data buffer for other purposes. In this regard, any discussion below regarding a host command data buffer for a read command may be applied to a host command data buffer for a write command.

In a first specific implementation, the memory device may use the host command data buffer in order to process the host command. As discussed above, the host command data buffer may be associated with a specific host command. Responsive to receipt of the specific host command, the memory device may perform a plurality of stages or steps in order to process the specific host command. For example, in processing a read command, the memory device in a first stage may read the data from non-volatile memory, and in one or more subsequent stages perform additional operation(s). The additional operation(s) may modify the data read from non-volatile memory in order to generate modified data. Examples of additional operations include, but are not limited to: error correction (e.g., one error correction stage or multiple error correction stages); cryptography (e.g., decryption) on the read data. For example the error correction stage(s) may generate error-corrected data. As another example, decryption operations may generate decrypted data. The memory device may use the host command data buffer in order to perform one or more of the stages in processing the host command. The data generated by a pre-final stage and stored in the host command data buffer is not for review by the host device, but for use as extended memory for the memory device. As one example, the memory device may use the host command data buffer in order to store the non-error-corrected data that was read from the non-volatile memory. As another example, the memory device may use the host command data buffer in order to store the error-corrected data (e.g., storing data resulting from a first stage of error correction in a multi-stage error correction process).

As another example, in processing a write command, the memory device may perform one or more stages prior to writing the data to non-volatile memory, such as performing error correction and/or encryption. In this regard, the memory device may use the host command data buffer in order to perform the one or more of the stages, such as error correction and/or encryption, in processing the host command.

In a second specific implementation, the memory device may use the host command data buffer in order to perform processes other than for the host command. In one implementation, the memory device may use the host command data buffer in order to perform internal operation(s), such as one or more internal memory management operations. Example internal memory management operations may include, but are not limited to: garbage collection; memory scrubbing (e.g., reading from each computer memory location, correcting bit errors (if any) with an error-correcting code (ECC), and writing the corrected data back to the same location); error handling processing; updating flash translation layer (FTL) tables which contain address translation; and control read operations. In practice, the memory device may generate data resulting from performing the internal operation(s), such as garbage collection data. In a first specific implementation (for a host command data buffer with a read command), the memory device may cause the data (such as the garbage collection data) to be stored in the host command data buffer (such as by a TLP request, discussed below). After the memory device uses the host command data buffer for storing the data (such as the garbage collection data), the memory device may store data that was generated responsive to executing the host command (e.g., command execution data). After the storage of the command execution data, the memory device may send a notification to the host device of completion of execution of the host command. In a second specific implementation (for a host command data buffer with a write command), the memory device may read the data from the host command data buffer. After which, the memory device may use the host command data buffer for storing the data (such as the garbage collection data), the memory device may store data resulting from performing the internal operation(s). After the memory device has completed the write command, the memory device may notify the host device of completion of the write command, and may also cease using the host command data buffer for storing the data. In a third specific implementation, the memory device may use the host command data buffer in order to process another host command. For example, the host device may assign the host command data buffer for a first host command. The memory device may use the host command data buffer in order to process a second host command.

Thus, the host command data buffers, such as an NVMe host memory read buffers, may be used as memory device temporal buffers during the execution of host commands, such as NVMe commands. One, some or all device internal pipeline stages may retrieve the data from the relevant host command data buffer, manipulate it, and write the processed data to the same host command data buffers. Alternatively, the host command data buffers may be used for internal relocation and garbage collection operations. In this way, the area and cost of the memory device controller may be reduced since less volatile memory is required.

Embodiments

The following embodiments describe non-volatile memory devices and related methods for processing of commands. Before turning to these and other embodiments, the following paragraphs provide a discussion of exemplary non-volatile memory devices and storage modules that can be used with these embodiments. Of course, these are just examples, and other suitable types of non-volatile memory devices and/or storage modules can be used.

FIG. 1A is a block diagram illustrating a non-volatile memory device 100. The non-volatile memory device 100 may include a controller 102 and non-volatile memory that may be made up of one or more non-volatile memory dies 104. As used herein, the term die refers to the set of non-volatile memory cells, and associated circuitry for managing the physical operation of those non-volatile memory cells, that are formed on a single semiconductor substrate. The controller 102 may interface with a host device or a host system and transmit command sequences for read, program, and erase operations to the non-volatile memory die(s) 104. As discussed below, the commands may include logical and/or physical addresses.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. One example of the firmware is a flash translation layer. In operation, when a host device needs to read data from or write data to the flash memory, it will communicate with the flash memory controller. In one embodiment, if the host device provides a logical address to which data is to be read/written, the flash memory controller can convert the logical address received from the host to a physical address in the flash memory. The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between the controller 102 and the non-volatile memory die(s) 104 may be any suitable flash interface, such as Toggle Mode 200, 400, or 800. In one embodiment, the memory device 100 may be a card based system, such as a secure digital (SD) or a micro secure digital (micro-SD) card. In an alternate embodiment, the non-volatile memory device 100 may be part of an embedded memory device.

Although in the example illustrated in FIG. 1A, the non-volatile memory device 100 may include a single channel between the controller 102 and the non-volatile memory die(s) 104, the subject matter described herein is not limited to having a single memory channel. For example, in some NAND memory device architectures, 2, 4, 8 or more NAND channels may exist between the controller and the NAND memory die(s) 104, depending on controller capabilities. In any of the embodiments described herein, more than a single channel may exist between the controller and the memory die(s) 104, even if a single channel is shown in the drawings.

Figure 1B:
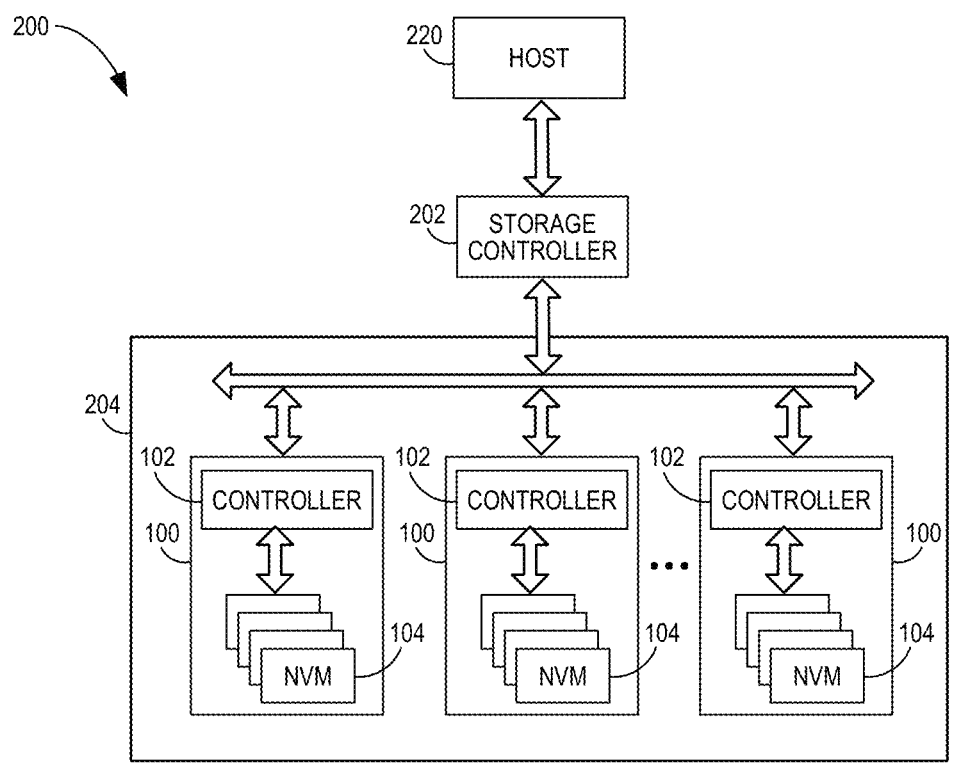
FIG. 1B is a block diagram of a storage module that includes a plurality of non-volatile memory systems and a host.

FIG. 1B illustrates a storage module 200 that includes plural non-volatile memory devices 100. As such, the storage module 200 may include a storage controller 202 that interfaces with a host 220 and with a storage system 204, which includes a plurality of non-volatile memory devices 100. The interface between the storage controller 202 and non-volatile memory devices 100 may be a bus interface, such as a serial advanced technology attachment (SATA), a peripheral component interface express (PCIe) interface, an embedded MultiMediaCard (eMMC) interface, a SD interface, or a Universal Serial Bus (USB) interface, as examples. The storage system 200, in one embodiment, may be a solid state drive (SSD), such as found in portable computing devices, such as laptop computers and tablet computers, and mobile phones.

Figure 1C:
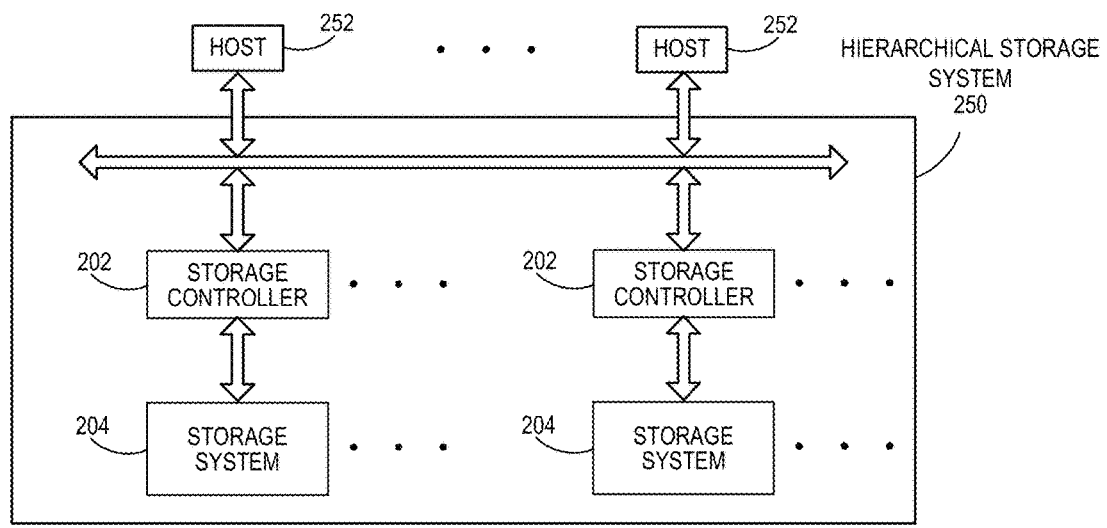
FIG. 1C is a block diagram of a hierarchical storage system.

FIG. 1C is a block diagram illustrating a hierarchical storage system 250. The hierarchical storage system 250 may include a plurality of storage controllers 202, each of which control a respective storage system 204. Host systems 252 may access memories within the hierarchical storage system 250 via a bus interface. Example bus interfaces may include a non-volatile memory express (NVMe), a fiber channel over Ethernet (FCoE) interface, an SD interface, a USB interface, a SATA interface, a PCIe interface, or an eMMC interface as examples. In one embodiment, the hierarchical storage system 250 illustrated in FIG. 1C may be a rack mountable mass storage system that is accessible by multiple host computers, such as would be found in a data center or other location where mass storage is needed. In one embodiment, host systems 252 may include the functionality described in host 220.

Figure 2A:
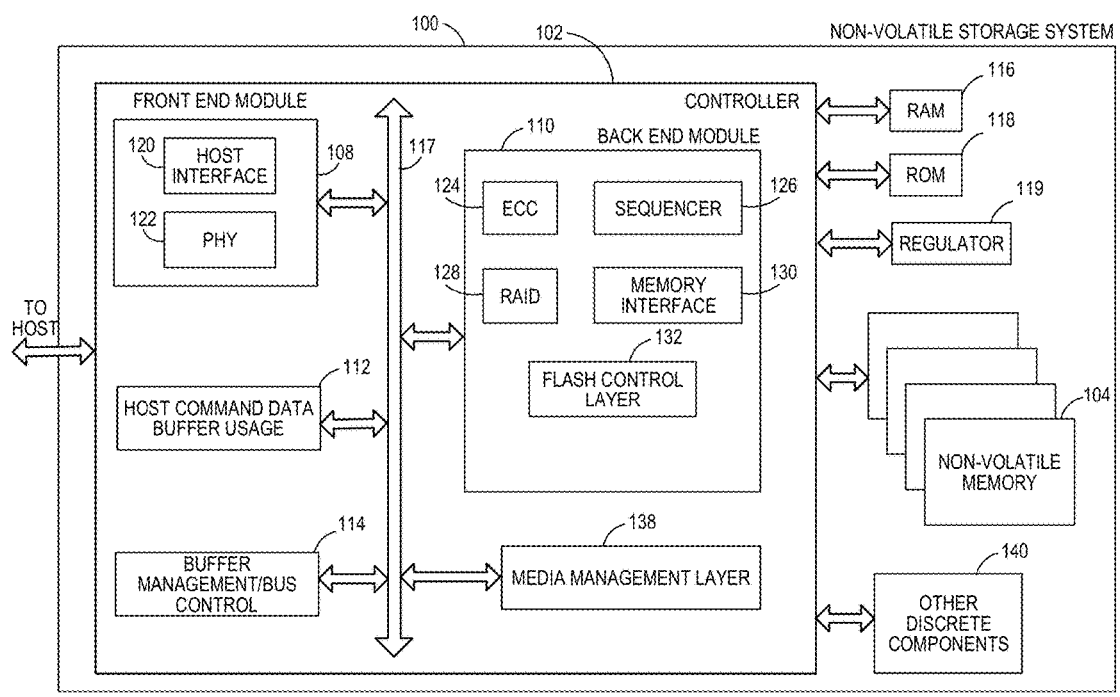
FIG. 2A is a block diagram of exemplary components of a controller of the non-volatile memory system of FIG. 1A.

FIG. 2A is a block diagram illustrating exemplary components of the controller 102 in more detail. The controller 102 may include a front end module 108 that interfaces with a host, a back end module 110 that interfaces with the non-volatile memory die(s) 104, and various other modules that perform various functions of the non-volatile memory device 100. In general, a module may be hardware or a combination of hardware and software. For example, each module may include an application specific integrated circuit (ASIC), a field programmable gate array (FPGA), a circuit, a digital logic circuit, an analog circuit, a combination of discrete circuits, gates, or any other type of hardware or combination thereof. In addition or alternatively, each module may include memory hardware that comprises instructions executable with a processor or processor circuitry to implement one or more of the features of the module. When any one of the module includes the portion of the memory that comprises instructions executable with the processor, the module may or may not include the processor. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 102 may include a buffer manager/bus control module 114 that manages buffers in random access memory (RAM) 116 and controls the internal bus arbitration for communication on an internal communications bus 117 of the controller 102. A read only memory (ROM) 118 may store and/or access system boot code. Although illustrated in FIG. 2A as located separately from the controller 102, in other embodiments one or both of the RAM 116 and the ROM 118 may be located within the controller 102. In yet other embodiments, portions of RAM 116 and ROM 118 may be located both within the controller 102 and outside the controller 102. Further, in some implementations, the controller 102, the RAM 116, and the ROM 118 may be located on separate semiconductor dies. As discussed below, in one implementation, the submission queues and the completion queues may be stored in the Controller Memory Buffer, which may be housed in RAM 116.

Additionally, the front end module 108 may include a host interface 120 and a physical layer interface (PHY) 122 that provide the electrical interface with the host or next level storage controller. The choice of the type of the host interface 120 can depend on the type of memory being used. Examples types of the host interface 120 may include, but are not limited to, SATA, SATA Express, SAS, Fibre Channel, USB, PCIe, and NVMe. The host interface 120 may typically facilitate transfer for data, control signals, and timing signals.

The back end module 110 may include an error correction controller (ECC) engine 124 that encodes the data bytes received from the host, and decodes and error corrects the data bytes read from the non-volatile memory die(s) 104. As discussed in more detail below, the ECC engine may be tunable, such as to generate different amounts of ECC data based on the mode (e.g., generate normal mode ECC data in normal programming mode and generate burst mode ECC data in burst programming mode, with the burst mode ECC data being greater than the normal mode ECC data). The back end module 110 may also include a command sequencer 126 that generates command sequences, such as program, read, and erase command sequences, to be transmitted to the non-volatile memory die(s) 104. Additionally, the back end module 110 may include a RAID (Redundant Array of Independent Drives) module 128 that manages generation of RAID parity and recovery of failed data. The RAID parity may be used as an additional level of integrity protection for the data being written into the non-volatile memory device 100. In some cases, the RAID module 128 may be a part of the ECC engine 124. A memory interface 130 provides the command sequences to the non-volatile memory die(s) 104 and receives status information from the non-volatile memory die(s) 104. Along with the command sequences and status information, data to be programmed into and read from the non-volatile memory die(s) 104 may be communicated through the memory interface 130. In one embodiment, the memory interface 130 may be a double data rate (DDR) interface, such as a Toggle Mode 200, 400, or 800 interface. A flash control layer 132 may control the overall operation of back end module 110.

Thus, the controller 102 may include one or more management tables for managing operations of storage system 100. One type of management table includes logical-to-physical address mapping table. The size of logical-to-physical address mapping table may grow with memory size. In this regard, the logical-to-physical address mapping table for high capacity storage device (e.g., greater than 32G) may be too large to store in SRAM, are may be stored in non-volatile memory 104 along with user and host data. Therefore, accesses to non-volatile memory 104 may first require reading the logical-to-physical address mapping table from non-volatile memory 104.

Additional modules of the non-volatile memory device 100 illustrated in FIG. 2A may include a media management layer 138, which performs wear leveling of memory cells of the non-volatile memory die 104. The non-volatile memory device 100 may also include other discrete components 140, such as external electrical interfaces, external RAM, resistors, capacitors, or other components that may interface with controller 102. In alternative embodiments, one or more of the RAID module 128, media management layer 138 and buffer management/bus controller 114 are optional components that may not be necessary in the controller 102.

Another module of the non-volatile memory device 100 illustrated in FIG. 2A may include host command data buffer usage 112. As discussed in more detail below, the memory device may determine whether to use the host command data buffer either to process the underlying host command, or for another operation, such as for performing internal memory management operations, with the memory device using the host command data buffer usage 112 to make the determination whether to use the host command data buffer, and if so, how to use the host command data buffer.

Figure 2B:
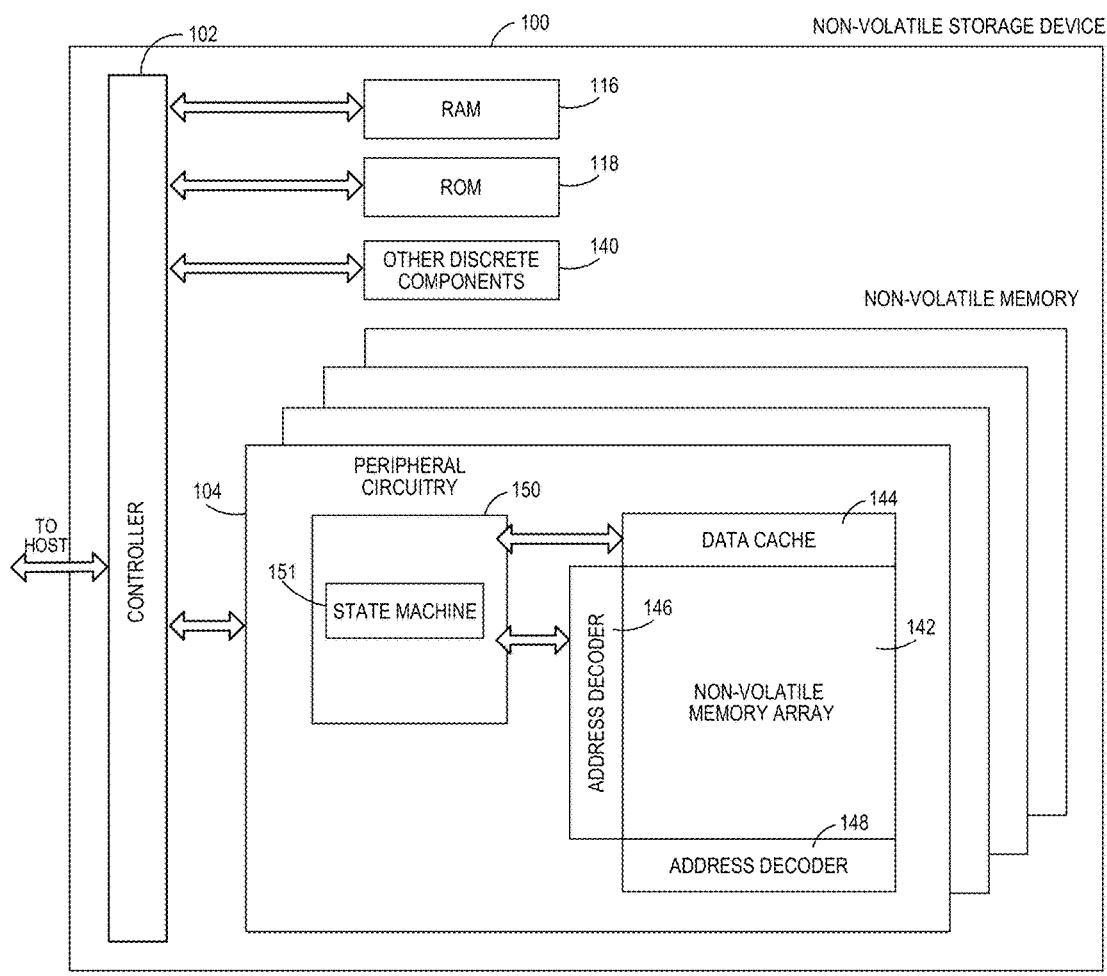
FIG. 2B is a block diagram of exemplary components of a non-volatile memory die of the non-volatile memory system of FIG. 1A.

FIG. 2B is a block diagram illustrating exemplary components of a non-volatile memory die 104 in more detail. The non-volatile memory die 104 may include a non-volatile memory array 142. The non-volatile memory array 142 may include a plurality of non-volatile memory elements or cells, each configured to store one or more bits of data. The non-volatile memory elements or cells may be any suitable non-volatile memory cells, including NAND flash memory cells and/or NOR flash memory cells in a two dimensional and/or three dimensional configuration. The memory cells may take the form of solid-state (e.g., flash) memory cells and can be one-time programmable, few-time programmable, or many-time programmable. In addition, the memory elements or cells may be configured as single-level cells (SLCs) that store a single bit of data per cell, multi-level cells (MLCs) that store multiple bits of data per cell, or combinations thereof. For some example configurations, the multi-level cells (MLCs) may include triple-level cells (TLCs) that store three bits of data per cell.

Additionally, a flash memory cell may include in the array 142 a floating gate transistor (FGT) that has a floating gate and a control gate. The floating gate is surrounded by an insulator or insulating material that helps retain charge in the floating gate. The presence or absence of charges inside the floating gate may cause a shift in a threshold voltage of the FGT, which is used to distinguish logic levels. That is, each FGT's threshold voltage may be indicative of the data stored in the memory cell. Hereafter, FGT, memory element and memory cell may be used interchangeably to refer to the same physical entity.

The memory cells may be disposed in the memory array 142 in accordance with a matrix-like structure of rows and columns of memory cells. At the intersection of a row and a column is a FGT (or memory cell). A column of FGTs may be referred to as a string. FGTs in a string or column may be electrically connected in series. A row of FGTs may be referred to as a page. Control gates of FGTs in a page or row may be electrically connected together.

The memory array 142 may also include wordlines and bitlines connected to the FGTs. Each page of FGTs is coupled to a wordline. In particular, each wordline may be coupled to the control gates of FGTs in a page. In addition, each string of FGTs may be coupled to a bitline. Further, a single string may span across multiple wordlines, and the number of FGTs in a string may be equal to the number of pages in a block.

The non-volatile memory die 104 may further include a page buffer or data cache 144 that caches data that is sensed from and/or that is to be programmed to the memory array 142. The non-volatile memory die 104 may also include a row address decoder 146 and a column address decoder 148. The row address decoder 146 may decode a row address and select a particular wordline in the memory array 142 when reading or writing data to/from the memory cells in the memory array 142. The column address decoder 148 may decode a column address to select a particular group of bitlines in the memory array 142 to be electrically coupled to the data cache 144.

In addition, the non-volatile memory die 104 may include peripheral circuitry 150. The peripheral circuitry 150 may include a state machine 151 that provides status information to the controller 102. Other functionality of the state machine 151 is described in further detail below.

Figure 3:
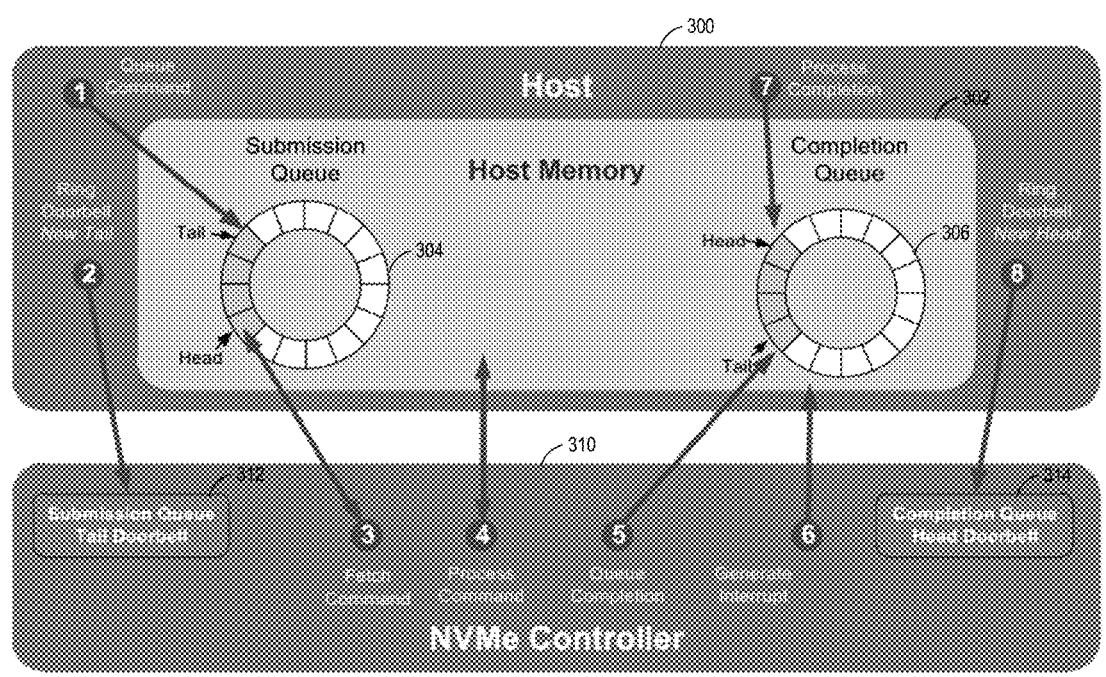
FIG. 3 is a block diagram of the host device and NVMe controller illustrating a sequence for a host device and a memory device to request and process an NVMe command.

FIG. 3 illustrates a sequence of steps for executing a command via the NVMe standard. The NVMe standard discloses a scalable host controller interface designed to address the needs of Enterprise and Client systems that utilize PCI Express-based solid state drives. Such systems are based on a paired submission queue and completion queue mechanism.

As shown, the host device 300 includes host memory 302, and the memory device includes a controller, such as an NVMe controller 310. In one implementation, the host memory 302 includes a submission queue 304 and a completion queue 306. Alternatively, the submission queue and completion queue are resident in the memory device, such as in a controller memory buffer. Further, in one implementation, the submission queues and completion queues may have a 1:1 correlation. Alternatively, the submission queues and completion queues do not have a 1:1 correlation.

In practice, at the initialization phase, the host device 300 creates one or more submission queues and one or more corresponding completion queues. In particular, the host device 300 may notify the memory device of the submission queue(s) and completion queue(s) by sending information, such as the base address for each queue to the memory device. In that regard, each submission queue has a corresponding completion queue. When the submission queue and the completion queue are resident in the host device, the host device sends information to the memory device in order for the memory device to determine the locations of the submission queue and the completion queue in the host device. In a specific implementation, the host device sends a command indicating the creation of the submission queue and the completion queue. The command may include a PRP1 pointer, which is a pointer to a list on the host device of the locations of the specific submission queue or the specific completion queue. In practice, the memory device sends a TLP read request using the PRP1 in order to obtain the PRP list, and stores the PRP list in the memory device to determine the memory locations within the host device for use in future commands to read from the specific submission queue or write to the specific completion queue. Alternatively, the host device 300 may instruct the memory device to create the submission queue(s) and corresponding completion queue(s) in a memory resident in the memory device, such as a controller memory buffer.

The submission queue 304 and completion queue 306 may be based on a ring buffer, with a head pointer and a tail pointer. In one implementation, the submission queue and completion queue are circular buffers with fixed slot sizes, such as 64 Bytes for submission queues and 16 Bytes for completion queues. For example, a host device may have up to 64K outstanding commands to a submission queue.

After creating the submission queue(s) and notifying the memory device about the created submission queue(s), the host device 300 may write a command (or several commands) to the submission queue. This is indicated in FIG. 3 as step 1, labeled "Queue Command". In particular, FIG. 3 illustrates that four commands were written to the submission queue. In one implementation, the memory device is unaware that the host device 300 has updated the submission queue 304 with four commands, since the host device 300 updated its own host memory 302. In another implementation (such as when the submission queue(s) and completion queue(s) are resident in the controller memory buffer, the memory device may monitor a communication interface between the host device 300 and the memory device for particular communications, such as writing to the submission queue(s) resident on the memory device. For example, the memory device can monitor the transport layer packets (TLPs) on the PCI Express bus, to determine whether the host device 300 has sent a TLP that results in an update to the submission queue resident in the controller memory buffer. In that regard, the memory device may identify one or more entries being written to the submission queue(s).

In step 2, the host device 300 writes to a submission queue tail doorbell register 312 in the memory device. This writing to the submission queue tail doorbell register 312 signifies to the memory device that the host device has queued one or more commands in this specific submission queue 304 (e.g., 4 commands as illustrated in FIG. 3). In particular, the writing to the submission queue tail doorbell register 312 is one form of notice by the host device to the memory device that the host device caused one or more commands to be placed in the submission queue.

The writing to the submission queue tail doorbell register 312 may take one of several forms. In one way, the host device 300 indicates a new tail for the submission queue 304, thereby indicating the number of commands written to the submission queue 304. Thus, since the memory device is aware of the base address for the submission queue 304, the memory device only needs to know the tail address to indicate the number of new commands written to the submission queue 304. After a command (or a set of commands) is processed, the memory device then sets the new head of the submission queue 304 accordingly. So that, the tail pointer may represent an "offset" from the head pointer. In another way, the host device 300 indicates a number of commands written to the submission queue 304. In practice, each submission queue 304 has a corresponding submission queue tail doorbell register in the memory device, so that when the host device 300 updates a particular doorbell register (correlated to a particular submission queue 304), the memory device can determine, based on the doorbell register, which particular submission queue 304 has been updated.

After step 2 (whereby the memory device is notified of command(s) on the submission queue 304) and before step 3 (whereby the memory device fetches the command(s), the memory device is aware that there are command(s) pending in the submission queue 304. In the general case, there may be several submission queues (with potentially many pending commands in the several submission queues). Thus, before performing step 3, the memory device controller may arbitrate between the various submission queues to select the particular submission queue from which to fetch the command(s). In this regard, the memory device may consider a single submission queue, alone, in deciding whether to fetch commands from that single submission queue. Alternatively, the memory device may consider multiple submission queues, in combination, in deciding whether to fetch commands from the multiple submission queues.

Responsive to determining which particular submission queue 304 from which to fetch the command(s), at step 3, the memory device fetches the command(s) from the particular submission queue 304. In practice, the memory device may access the base address of the particular submission queue 304 plus the pointer on the current head pointer implemented in the host device 300.

As discussed above, the submission queue or completion queue may be assigned an area of memory (such as in the host device). The submission queue and completion queues may include multiple entries, each associated with a specific command. The size of each entry may be a predetermined size, such as 64 Kb. In this regard, entries within the submission queue may be determined using the base address for the submission queue, and by offsetting the base address with the number of entries multiplied by the size of each entry (e.g., 64 Kb). Further, a specific command may have an associated host command data buffer, in which the results of completing execution of the command may be stored.

As discussed above, the memory device is aware of the tail pointer, having been notified via step 2. Thus, the memory device can obtain all of the new commands from the submission queue 304. In NVMe, the memory device may send a TLP request to obtain the command(s) from the submission queue 304. Responsive to receipt of the TLP request, the host device 300 sends a completion TLP message with the commands in the submission queue 304. In this regard, at end of step 3, the memory device receives the command(s) from the submission queue 304.

At step 4, the memory device processes the command. In one implementation, the memory device parses the commands, and determines the steps to execute the commands (e.g., read/write/etc.). For example, the command may comprise a read command. Responsive to receipt of the read command, the memory device parses the read command, implements the address translation, and accesses the flash to receive the data. After receiving the data, the memory device may perform error correction on the data accessed from flash. Thereafter, the memory device may cause the error-corrected data to be stored on the host device based on information in the command (e.g., the PRP1 discussed below). In particular, the PRP1 may define the location (e.g., the address range) of the host command data buffer that resides on the host. As another example, the command may comprise a write command. Responsive to receipt of the write command, the memory device parses the write command, determines the location of the data on the host device subject to the write, reads the data from the location on the host device, and writes the data to flash memory.

In particular, the memory device may receive a read command or write command with a PRP1 pointer. For example, a read command, in which the host device requests the memory device to read from the flash memory, includes a PRP1 pointer, which points to a PRP list. The memory device obtains the PRP list in order to determine the memory locations within the host device to write the data that was read from the flash memory. In this regard, the PRP1 pointer and the PRP list may define the host command data buffer residing on the host device. As another example, a write command, in which the host device requests the memory device to write data to the flash memory, includes a PRP1 pointer, which points to a PRP list. The memory device obtains the PRP list in order to determine the memory locations within the host device to read the data from (and thereafter save the read data to the flash memory).

Each entry in the PRP list may be associated with a certain section in the host device memory, and may be a predetermined size, such as 4 Kb. Thus, in a 1 Mb transfer, there may be 250 references in the PRP list, each 4 Kb in size. In practice, the memory device may retrieve data out of sequence. This may be due to the data subject to retrieval being on several flash dies, with the dies being available for data retrieval at different times. For example, the memory device may retrieve the data corresponding to 100-200 Kb of the 1 Mb transfer before retrieving the data corresponding to 0-100 Kb of the 1 Mb transfer. Nevertheless, because the memory device has the PRP list (and therefore knows the memory locations the host device expects the data corresponding to 100-200 Kb to be stored), the memory device may transfer the data corresponding to 100-200 Kb of the 1 Mb transfer without having first retrieved the data corresponding to 0-100 Kb of the 1 Mb transfer.

In NVMe, there may be a multitude of PCI Express TLPs to transfer the data from the memory device to the host device 300. Typically, the transferred data is stored in the host memory 302 of the host device 300 based on an indication in the command (e.g., the command includes an address to store the requested data).

After completing the data transfer, at step 5, the memory device controller sends a completion message to the relevant completion queue 306. As mentioned above, at the initialization phase, the host device 300 associates submission queues with completion queues. So that, the host device 300 is aware of commands that are completed in the submission queue based on which completion queue the memory device writes to. The completion message may contain information as to the processing of the command(s), such as whether the command was completed successfully or whether there was an error when executing the command.

After step 5, the host device 300 is unaware that the memory device posted to the completion queue 306. This is due to the memory device causing data to be written to the completion queue 306. In that regard, at step 6, the memory device notifies the host device 300 that there has been an update to the completion queue 306. In particular, the memory device posts an interrupt to the host device 300 (e.g., in NVMe, the host device 300 may use an MSIe interrupt). The interrupt indicates to the host device that there is an entry on the completion queue 306. As discussed in more detail below, in one implementation, the memory device may use the host command data buffer until the memory device notifies the host device at step 6 that there has been an update to the completion queue 306.

Responsive to receiving the interrupt, the host device 300 determines that there are one or more completion entries pending for the host device 300 in this completion queue 306. At step 7, the host device 300 then processes the entries in the completion queue 306. Thus, responsive to the host device receiving the interrupt, the host device, in the example of a host read command, reads the data that is stored in the host data buffer. Thus, the interrupt serves to notify the host device of completion of execution of the host read command, and in turn, indicating to the host device to read the data from the host buffer.

After the host processes the entries from the completion queue 306, at step 8, the host device 300 notifies the memory device of the entries that the host device 300 processed from the completion queue 306. This may be performed by updating a completion queue head doorbell register 314 indicative to the memory device that the host device 300 processed one or more entries from the completion queue 306.

Responsive to updating the completion queue head doorbell register 314, the memory device updates the head of the completion queue 306. Given the new head, the memory device is aware as to which entries in the completion queue 306 have already been processed by the host device 300 and may be overwritten.

Figure 4A:
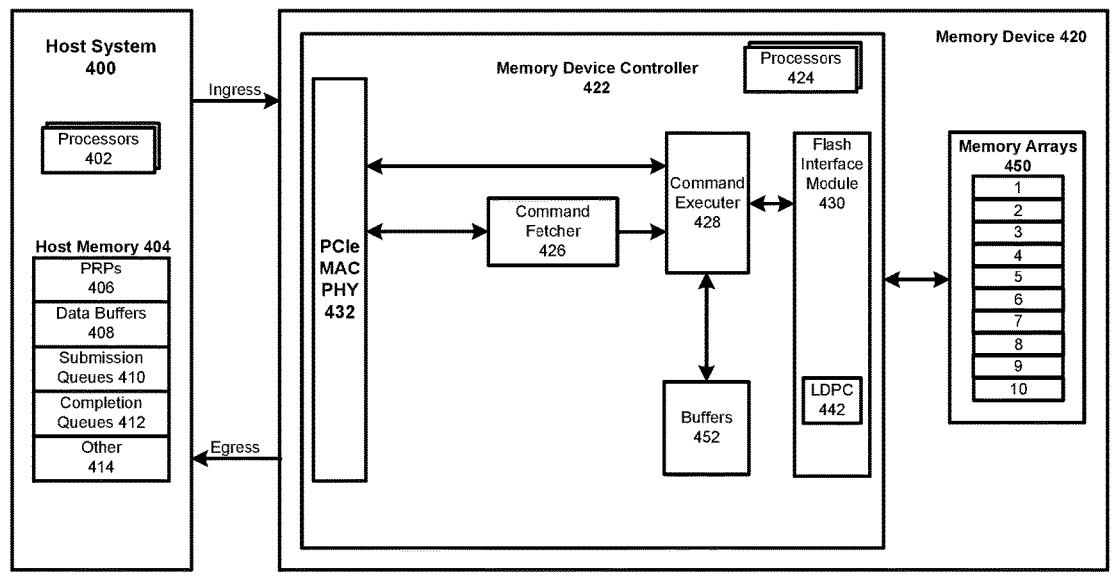
FIG. 4A is one example of a block diagram of exemplary components of a host system and a memory device.

FIG. 4A is one example of a block diagram of exemplary components of a host system 400 and a memory device 420. The host system 400 includes one or more processors 402 and host memory 404. Host memory 404 may comprise Physical Region Pages (PRPs) 406, data buffers 408 (such as one or more host command data buffers), one or more submission queues 410, one or more completion queues 412, and other memory 414.

FIG. 4A further illustrates a communication interface between the host device 400 and the memory device 420. In a first implementation (not illustrated in FIG. 4A), the communication interface between the host device and the memory device is simplex, with communications to and communications from the memory device on the same path. In a second implementation (illustrated in FIG. 4A), the communication interface between the host device 400 and the memory device 420 is duplex, with a separate ingress path and a separate egress path. The ingress path, from the perspective of the memory device 420, includes incoming requests from the host device 400 to the memory device 420. Conversely, the egress path, from the perspective of the memory device 420, includes outgoing requests from the memory device 420 to the host device 400.

The incoming requests (requests from the host device 400 to the memory device 420) may be segmented in different ways, such as incoming read requests and incoming write requests. For example, the host device 400 may send, via the ingress path, a read request to read a section of memory in the memory device 420 or a write request to write to a section of memory in the memory device 420. Likewise, the memory device 420 may send, via the egress path, a read request to a section of memory in the host device 400 or a write request to write to a section of memory (e.g., to a specific host command data buffer) in the host device 400.

In practice using NVMe, there may be a series of read requests (e.g., one or more requests by the host device to read data resident on the memory device) and a series of write requests (e.g., one or more requests by the host device to write data to a location resident on the memory device). In particular, in NVMe, the memory device and the host device communicate with one another using transaction layer packet (TLP) requests, such as TLP read requests to perform a read on the other device, or TLP write requests to perform a write to the other device. In one example (with the submission queue and the completion queue resident on the host device), responsive to a TLP write request (sent via the ingress path) by the host device to the doorbell register on the memory device (with the write to the doorbell register indicating that there is a command on the submission queue), the memory device uses a TLP read request (sent via the egress path) to fetch the write command from the submission queue (which is resident on the host device). Thus, the write command is a request for the memory device to write data to the non-volatile memory. The memory device then parses the write command for information, such as an indication of a PRP pointer (e.g., PRP 1) to a PRP list. The PRP list is a series of information, such as pointers or addresses, that indicates the location of the data in the host device. The memory device then uses another TLP read request to read data from the pointers or address in the PRP list. Thereafter, the memory device performs the write by storing the data in non-volatile memory (e.g., flash memory) on the memory device. After storing the data, the memory device uses a TLP write request to write an entry to the completion queue (indicating that the write command has been completed). Finally, the memory device uses a TLP write request to generate an interrupt to the host device, with the interrupt signaling to the host device that there is an entry on the completion queue. Responsive to the interrupt, the host device reads the entry on the completion queue, and then issues a TLP write request to CQ Doorbell Write register indicating that the host device has reviewed the entry on the completion queue.

As another example (again with the submission queue and the completion queue resident on the host device), responsive to a TLP write request by the host device to the doorbell register on the memory device (with the write to the doorbell register indicating that there is a command on the submission queue), the memory device uses a TLP read request to fetch the read command from the submission queue (which is resident on the host device). Thus, the read command is a request for the memory device to read data from the non-volatile memory and to send the read data to the host device. Similar to the write command, the memory device then parses the read command for information, such as an indication of a PRP pointer (e.g., PRP1) to a PRP list. The PRP list is a series of information, such as pointers or addresses, that indicates the location within the host device where the memory device is to store the data that was read responsive to the read command (e.g., the host command data buffer). The memory device then reads the non-volatile memory (e.g., flash memory) to read the data. The memory device can perform a series of operations on the data, such as error correction, encryption/decryption, etc. As discussed below, in one implementation, the memory device may perform the series of operation on the data with storage buffers interspersed between each of the serial operations. In an alternate implementation, the memory device may use the host command data buffer resident on the host device in place of the storage buffers, as discussed further below. The memory device may then parse the read command for information, such as an indication of a PRP pointer (e.g., PRP1) to a PRP list. The PRP list is a series of information, such as pointers or addresses, that indicates the location in the host device to store the data for consumption and review by the host device (e.g., that was read from non-volatile memory and optionally error-corrected, encrypted, etc.). The memory device uses a TLP read request to read data from the pointers or address in the PRP list. Thereafter, the memory device uses a TLP write request to write the error-corrected/encrypted data that was read from non-volatile memory. After writing the data to the host device, the memory device uses a TLP write request to write an entry to the completion queue (indicating that the read command has been completed). Finally, the memory device uses a TLP write request to generate an interrupt to the host device, with the interrupt signaling to the host device that there is an entry on the completion queue. Responsive to the interrupt, the host device reads the entry on the completion queue, and then issues a TLP write request to CQ Doorbell Write register indicating that the host device has reviewed the entry on the completion queue.

Memory device 420 includes the memory device controller 422 and memory arrays 450. Memory arrays 450 may be segmented in various ways, such as in 10 sections as illustrated in FIG. 4A. The memory device controller 422 may include one or more processors 424, and incorporate one or all of a PCIe MAC and PHY interface 432. Flash interface module 430 is configured to control and access the memory arrays 450. In FIG. 4A, Flash interface module 430 also includes the low-density parity-check (LDPC) 442 which is a linear error correcting code. Other methods in addition to or instead of LDPC 442 for error correction are contemplated.

Command fetcher 426 is configured to fetch the commands from the submission queues 410 on the host system 400 and queue them internally to the memory device 420. Command executer 428 is configured to arbitrate and execute the commands that were fetched from the submission queues 410. As discussed in more detail below, command executer 428 may be configured to perform the series of operations on the data read from the memory arrays 450, and to cause the data generated by the each of the serial operations to be stored in buffers 452. Alternatively, processors 424 may be configured to cause the data generated by the each of the serial operations to be stored in buffers 452.

Figure 4B:
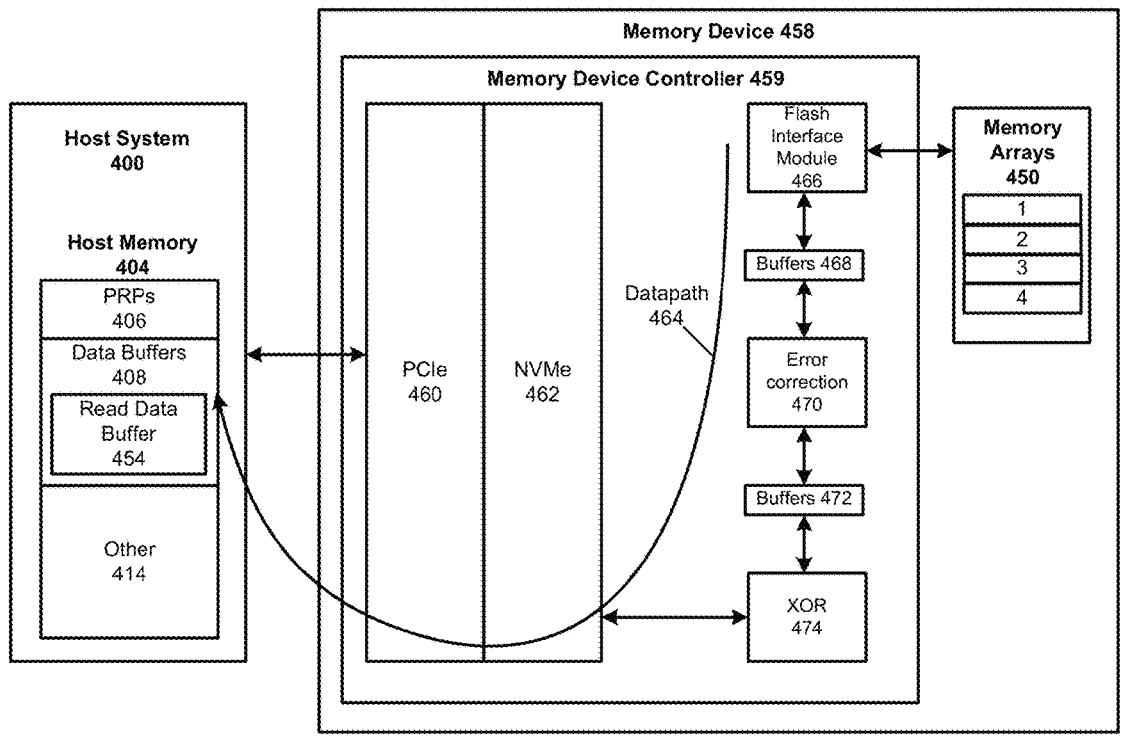
FIG. 4B is another example of a block diagram of exemplary components of a host system and a memory device, with a typical datapath illustrated.

FIG. 4B is another example of a block diagram of exemplary components of a host system 400 and a memory device 458, with a datapath 464 illustrated. Host system 400 issues a read command for execution by memory device 458. The read command includes an indication of a data buffer resident on host system 400 for memory device 458 to store the read data therein. As shown in FIG. 4B, the data buffer resident on host system 400 is designated read data buffer 454. Read data buffer 454 is of sufficient size to store all of the data responsive to the read command issued by host system 400. Thus, when issuing a command, host system 400 provides a list of buffer pointers to the memory device 458. As illustrated in FIG. 4B, the memory device controller 459 may include a PCIe MAC+PHY 460 and an implementation of NVMe layer 462, and further includes a plurality of pipeline stages, discussed below.

As shown, flash interface module 466 reads data from memory arrays 450, and stores the read data into buffer 468. For example, flash interface module 466 is configured to interact with memory arrays 450, such as storing data to and reading data from memory arrays 450. Further, flash interface module 466 is configured to store one or more blocks of data into buffer 468. Error correction 470 is performed on the data stored in buffers 468 in order to generate error-corrected data. For example, error correction 470 may perform error correction while implementing descrambling and decoding. After which, error correction 470 may store the error-corrected data in buffers 472. Additional error correction may be performed, such as with XOR 474, on the data stored in buffers 472. In this regard, after XOR 474 performs additional error correction (such as by XOR-ing the data for parity protection), the data is transmitted via one or more interfaces, such as PCIe 460 or NVMe 462, to host system 400 for storage in read data buffer 454 of data buffers 408. Buffers 468, 472 are of sufficient size to store data from one or more blocks. As shown in FIG. 4B, a buffer is implemented between each one of the pipeline stages for holding the data. Further, the read data flow, embodied in datapath 464, is as follows: reading the data from the memory arrays 450 and storing the data in buffer 468 between the flash interface module 466 and the error correction 470; reading the data from the buffer 468, correcting the data (using error correction 470) and writing the corrected data to buffer 472. This is done by the Error Correction Module; reading the data from the buffer 472, XOR-ing the data (using XOR 474) and writing the data to the read data buffer 454. After which, the memory device posts a completion message to host system 400. Responsive to the posting of the completion message, host system 400 reads the data from read data buffer 454. Though FIG. 4B illustrates 3 stages, fewer or greater numbers of stages (and buffers between the stages) are contemplated.

Figure 4C:
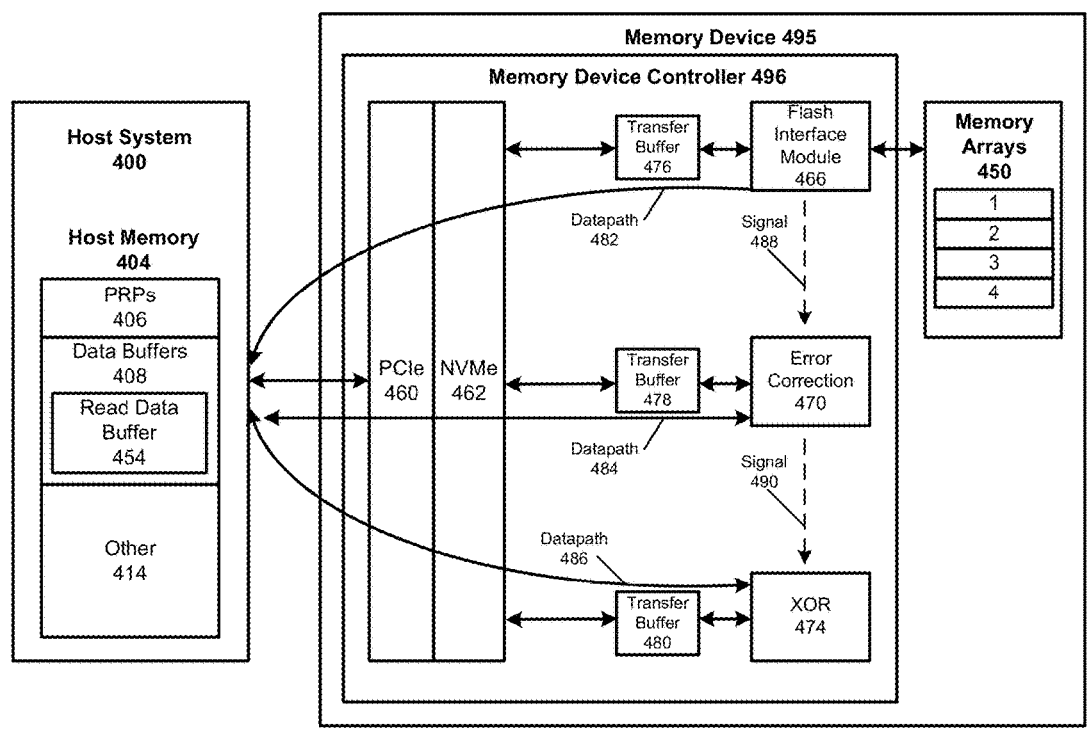
FIG. 4C is yet another example of a block diagram of exemplary components of a host system and a memory device, with datapaths illustrated according to one implementation.

FIG. 4C is yet another example of a block diagram of exemplary components of a host system 400 and a memory device 495, with datapaths 482, 484, 486 illustrated according to one implementation. Similar to FIG. 4B, flash interface module 466, within memory device controller 496, reads from memory arrays 450, and stores the data in one or more transfer buffers, such as transfer buffer 476. However, transfer buffer 476 is smaller in size than buffer 468 and may comprises a FIFO buffer. In this regard, flash interface module 466 may store only a portion of the data responsive to the read command in transfer buffer 476. For example, when reading 32 Kb from flash memory 450, the flash interface module 466 may transfer 4K to the one or more transfer buffers, such as transfer buffer 478. After which, the memory device 495 issues a TLP PCIe read/write transaction (with the address of read data buffer 454) over the PCI express bus. Host system 400 detects all transactions received from memory device 495, including the TLP PCIe read/write transaction. In this regard, host system 400 may detect that the TLP PCIe read/write transaction is for transfer to read data buffer 454, which may comprise DRAM, and store the 4K of data read from memory arrays 450. For example, the first 4K read by flash interface module 466 may be stored in the first 4K of read data buffer 454. Likewise, the second 4K read by flash interface module 466 may be stored in the second 4K of read data buffer 454, etc.

After the transfer via datapath 482, error correction 470 is notified of the transfer. As shown in FIG. 4C, flash interface module 466 notifies error correction 470 via signal 488. Alternatively, error correction 470 may be notified by a central controller resident in memory device 495. Regardless, error correction 470 may be notified that read data buffer 454 includes data for access. In the example of storing 4K of data in read data buffer 454, error correction 470 may be notified of the location of the 4K of data in read data buffer 454 (e.g., the first 4K within read data buffer 454), issue a TLP PCIe read transaction, and transfer the 4K of data to transfer buffer 478. Error correction 470 may then perform error correction on the 4K of data in transfer buffer 478 in order to generate error-corrected data, and thereafter send the error-corrected data via datapath 484 back to the read data buffer 454 (e.g., via a TLP PCIe write transaction, writing the error-corrected data to the first 4K within read data buffer 454). Thus, error correction 470 may operate on the first 4K of data after flash interface module 466 has written the first 4K of data to read data buffer 454.

After the transfer via datapath 484, XOR 474 is notified of the transfer. As shown in FIG. 4C, error correction 470 notifies XOR 474 via signal 490. Alternatively, XOR 474 may be notified by a central controller resident in memory device 495. Regardless, XOR 474 may be notified that read data buffer 454 includes data for access. Again, in the example of storing 4K of data in read data buffer 454, XOR 474 may be notified of the location of the 4K of data in read data buffer 454 (e.g., the first 4K within read data buffer 454), issue a TLP PCIe read transaction, and transfer the 4K of data to transfer buffer 480. XOR 474 may then perform an XOR operation on the 4K of data in transfer buffer 480 in order to generate XOR-corrected data, and thereafter send the XOR-corrected data via datapath 484 back to the read data buffer 454 (e.g., via a TLP PCIe write transaction, writing the XOR-corrected data to the first 4K within read data buffer 454). Further, after error correction 470 has written the second 4K of data to read data buffer 454, XOR 474 may operate on the second 4K of data written to read data buffer 454, and so on. In this regard, the processing in stages may be staggered amongst different sections or chunks of data stored in read data buffer 454.

The process illustrated in FIG. 4C results in a greater number of transactions over the PCIe bus. In that regard, the processing of the command may take longer than if the data was resident in the memory device controller, such as illustrated in FIG. 4B. However, the process may be used in applications where a memory device controller with smaller buffers is acceptable and where speed of execution is of lesser importance (such as with mobile applications).

The series of operations illustrated in FIG. 4C includes error correction stages. Alternatively, or in addition, a security stage (such as encryption or decryption) may be performed. In this regard, memory device 495 may use NVMe host read data buffers 408 as extended internal RAM during the execution of the relevant NVMe read command. Specifically, memory device 495 may use NVMe Host read data buffers 408 during a specific time period, such as until posting a completion message to host system 400 for the relevant NVMe read command, since host system 400 does not use the NVMe Host read data buffers 408 until the posting. Further, as shown in FIG. 4C, each internal memory device pipeline stage in the read flow writes the data to the relevant section within the read data buffer 454 even though it is not the final data that should be provided to the host system 400. The next pipeline stage reads the data from the read data buffer 454, implements any functionality of this data and writes it back to the same read data buffer 454. The memory device 495 posts a completion message only after having the final user data in the read data buffer 454 associated with the relevant NVMe read command.

Thus, as shown in FIG. 4C, the memory device 495 uses read data buffer 454 between each one of the pipeline stages for holding the data. Further, the read data flow, embodied in datapaths 482, 484, 486, is as follows: reading the data from the memory arrays 450 and storing, by the flash interface module 466, the data in read data buffer 454; reading the data from read data buffer 454, correcting the data using error correction 470 and writing, by error correction 470, the corrected data to read data buffer 454; reading the data from read data buffer 454, XOR-ing the data (using XOR 474) and writing, by XOR 474, the result to read data buffer 454. After which, the memory device posts a completion message to host system 400. Responsive to the posting of the completion message, host system 400 reads the data from read data buffer 454. Though FIG. 4C illustrates 3 stages, there may be fewer or greater number of pipeline stages, whereby each stage fetches the data from read data buffer 454, manipulates it, and writes the result back to read data buffer 454.

In other implementations, the read data buffer 454 may be used for other purposes and not related to the execution of the relevant NVMe read command. For example, the read data buffer 454 may be used for internal relocation and garbage collection operations. In this way, memory device controller 496 within memory device 495 may contain smaller internal buffers since data buffers 408 may be used instead. In particular, use of data buffers 408 reduces the need for large internal buffers (which may be located within the memory device controller) between the pipeline stages in the read flow as well as other buffers.

Figure 5:
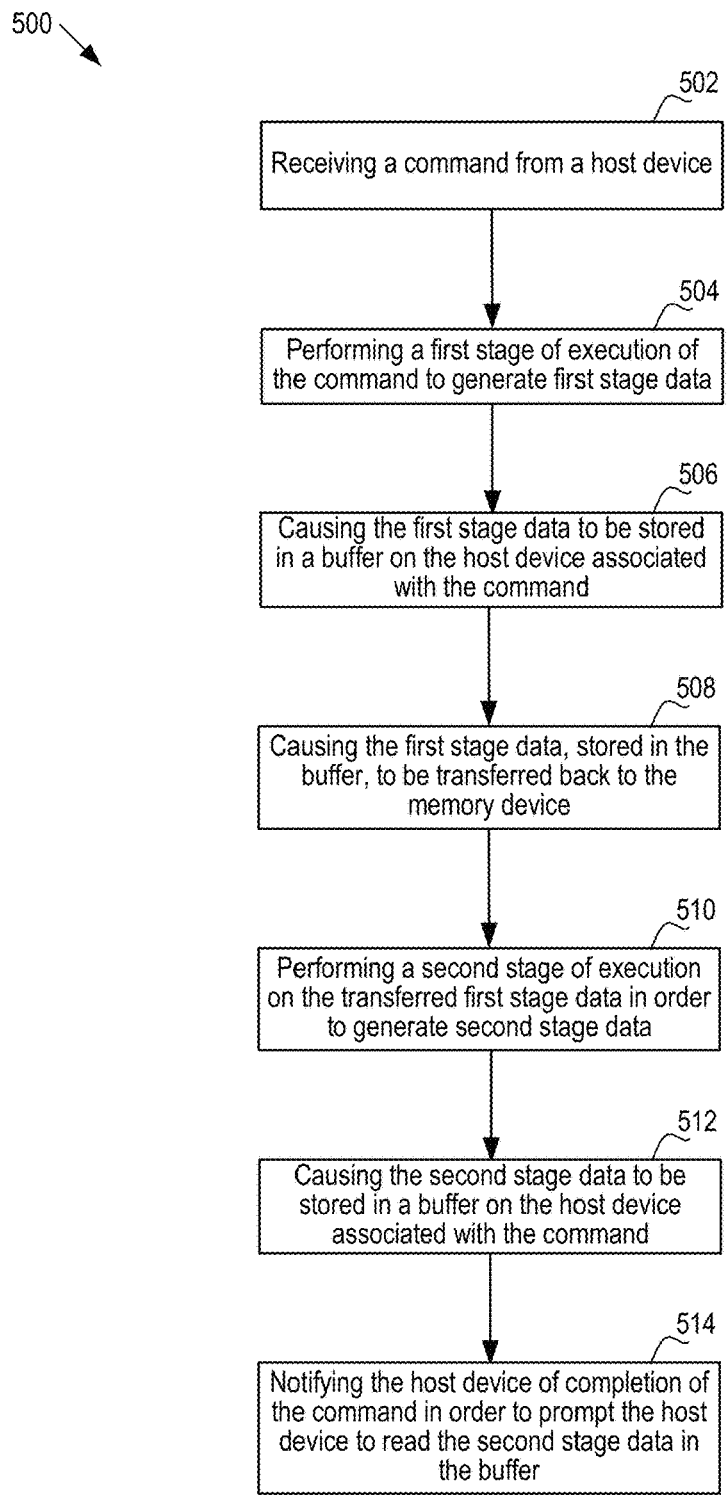
FIG. 5 is a flow chart of the memory device using the host command data buffer for executing different stages of the host command.

FIG. 5 is a flow chart 500 of the memory device using the host command data buffer for executing different stages of the host command. At 502, the memory device receives the command from the host device. As discussed above, the memory device may fetch the command from a submission queue in order to receive the command. At 504, the memory device performs a first stage of execution of the command in order to generate first stage data. As discussed above, execution of a command may be performed in a series of stages. In this regard, the data, such as first stage data after execution of the first stage, may be generated. At 506, the memory device causes the first stage data to be stored in a buffer on the host device associated with the command. As discussed above, the memory device may cause data to be stored in the data buffer associated with the command in one of several ways, such as via a TLP request. After the first stage data is stored in the buffer on the host device associated with the command, at 508, the memory device may cause the first stage data to be transferred back to the memory device. At 510, the memory device may then perform a second stage of execution on the transferred first stage data in order to generate second stage data. Thereafter, at 512, the memory device causes the second stage data to be stored in the buffer on the host device associated with the command. At 514, the memory device notifies the host device of completion of the command in order to prompt the host device to read the second stage data in the buffer. As discussed above, the processing of the command may be in multiple stages, such as two stages (as depicted in FIG. 5), three stages (as depicted in FIG. 4C), or more stages. Thus, after completion of all the stages of processing the command, the memory device may notify the host device of completion of execution of the command.

Figure 6:
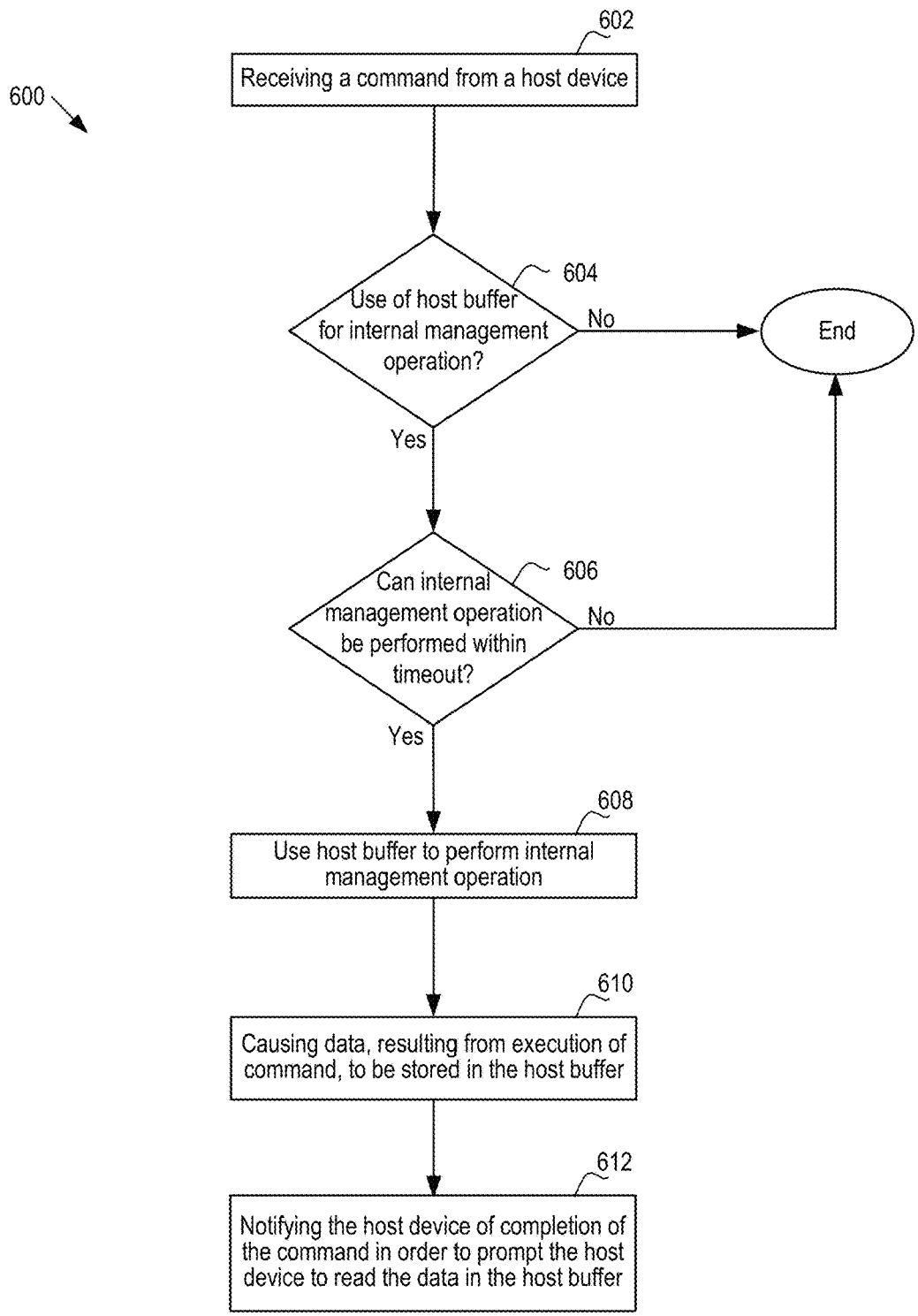
FIG. 6 is a flow chart of the memory device using the host command data buffer for executing an internal memory management operation.

FIG. 6 is a flow chart 600 of the memory device using the host command data buffer for executing an internal memory management operation. At 602, the memory device receives a command from the host device. At 604, the memory device determines whether to use the host buffer (e.g., the buffer resident on the host device and assigned associated with execution of the command) for an internal management operation. In this regard, the host buffer may be used other than for submitting data, responsive to the execution of the command, for the host device to review. If the host buffer is not to be used for an internal operation, flow chart 600 ends. If so, at 606, the memory device may optionally determine whether the internal management operation can be performed within the timeout period of the command. In certain instances, the host device expects the memory device to complete execution of the command within a timeout period. Otherwise, the host device determines that an error has occurred. In this instance, the memory device may determine whether the internal operation, using the host buffer, may complete execution within the timeout. If not, the host buffer is not used, and flow chart 600 ends. If so, at 608, the memory device uses the host buffer in order to perform the internal operation. After which, at 610, the memory device causes data, resulting from execution of the command, to be stored in the host buffer in order for the host device to review the data. At 612, the memory device notifies the host device of completion of execution of the command in order to prompt the host device to read the data in the host buffer.

Lastly, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

The invention claimed is:

1. A method comprising:
in a memory device:
receiving, from a host device, one or more notifications indicative of a host command and of a host buffer in the host device for the memory device to use responsive to executing the host command, wherein execution by the memory device of the host command is performed in at least a first stage and a second stage;
performing the first stage to generate first stage data;
causing the first stage data to be stored in the host buffer;
causing the first stage data to be transferred from the host buffer back to the memory device;
performing, using the first stage data transferred from the host buffer, the second stage to generate second stage data;

causing the second stage data to be stored in the host buffer; and notifying the host device of completion of execution of the host command.

2. The method of claim 1, wherein:
the host command comprises a read command;
the memory device is configured to cause the second stage data to be stored in the host buffer responsive to executing the host command; and
notifying the host device of completion of execution of the host command that indicates to the host device to read the second stage data from the host buffer.

3. The method of claim 2, wherein the first stage comprises reading data from non-volatile memory in the memory device.

4. The method of claim 3, wherein the second stage comprises error correction.

5. The method of claim 4, wherein:
execution by the memory device of the host command comprises multiple error correction stages; and
after each error correction stage, the memory device causes data resulting from each error correction stage to be stored in the host buffer.

6. The method of claim 1, wherein:
the host command comprises a write command; and
the memory device is configured to read data from the host buffer to store the read data in non-volatile memory in the memory device.

7. The method of claim 1, wherein the host command comprises a Non-Volatile Memory Express (NVMe) command.

8. The method of claim 1, wherein performing the first stage to generate first stage data comprises using one or more transfer buffers to store the first stage data prior to causing the first stage data to be transferred from the one or more transfer buffers to the host buffer.

9. The method of claim 8, wherein:
performing the second stage to generate second stage data comprises using the one or more transfer buffers to store the first stage data transferred from the host buffer; and
causing the second stage data to be stored in the host buffer comprises using the one or more transfer buffers to store the second stage data prior to causing the second stage data to be transferred from the one or more transfer buffers to the host buffer.

10. A memory device comprising:
a communication interface configured to communicate with a host device;
non-volatile memory;
volatile memory; and
a controller configured to communicate with the communication interface, the non-volatile memory, and the volatile memory, the controller further configured to:
receive, from the host device via the communication interface, one or more notifications indicative of a read command and of a host buffer in the host device for the memory device to cause data, read responsive to the read command, to be stored therein;
read, from the non-volatile memory, the data responsive to the read command;
store the read data in the volatile memory;
after storing the read data in the volatile memory, cause the read data stored in the volatile memory to be stored in the host buffer;
cause transfer of the read data from the host buffer back to the volatile memory;
perform at least one additional operation on the read data transferred from the host buffer back to the volatile memory to generate modified data; and
cause transfer of the modified data to the host buffer.

11. The memory device of claim 10, wherein:
the at least one additional operation comprises one or more error correction operations; and
the modified data comprises error-corrected data.

12. The memory device of claim 11, wherein the controller is further configured to:
after causing the transfer of the error-corrected data to the host buffer, notify the host device of completion of execution of the read command,
wherein the notification indicates to the host device to read the error-corrected data stored in the host buffer.

13. The memory device of claim 10, wherein:
the at least one additional operation comprises an encryption operation or a decryption operation; and
the modified data comprises crypto-data.

14. The memory device of claim 10, wherein the volatile memory comprises one or more transfer buffers.

15. A memory device comprising:
a communication interface configured to communicate with a host device;
non-volatile memory; and
a controller configured to communicate with the communication interface and the non-volatile memory, the controller further configured to:
receive, from the host device via the communication interface, one or more notifications indicative of a host command and of a host buffer in the host device for the memory device to use responsive to executing the host command, to be stored therein, the host buffer for use by the memory device until the memory device notifies the host device of completion of execution of the host command;
responsive to receiving the one or more notifications, determine an internal operation to perform using the host buffer, the internal operation comprising an operation internal to the memory device for management of the non-volatile memory;
cause data to be stored to and read from the host buffer to perform the internal operation;
after causing data to be stored to and read from the host buffer to perform the internal operation, cause command execution data to be stored to the host buffer, the command execution data responsive to executing the host command; and
after causing the command execution data to be stored to the host buffer, send a notification to the host device of completion of execution of the host command for the host device to read the command execution data from the host buffer.

16. The memory device of claim 15, wherein:
the memory device is configured to send the notification to the host device of completion of execution of the host command within a timeout period; and
the controller is configured to determine the internal operation to perform using the host buffer by selecting the internal operation that is completed within the timeout period.

17. The memory device of claim 15, wherein the internal operation comprises garbage collection.

18. The memory device of claim 15, wherein the non-volatile memory comprises a substrate formed with a three-dimensional memory structure.

19. A memory device comprising:

non-volatile memory;

means for receiving, from a host device, one or more notifications indicative of a host command and of a host buffer in the host device for the memory device to use responsive to executing the host command, to be stored therein, the host buffer for use by the memory device until the memory device notifies the host device of completion of execution of the host command;

means, responsive to receiving the one or more notifications, for determining an internal operation to perform using the host buffer, the internal operation comprising an operation internal to the memory device for management of the non-volatile memory;

means for causing data to be stored to and read from the host buffer to perform the internal operation;

means, after causing data to be stored to and read from the host buffer to perform the internal operation, for causing command execution data to be stored to the host buffer, the command execution data responsive to executing the host command; and means, after causing the command execution data to be stored to the host buffer, for sending a notification to the host device of completion of execution of the host command for the host device to read the command execution data from the host buffer.

20. The memory device of claim 19, wherein the internal operation comprises garbage collection.

* * * * *